US010657021B2

(12) United States Patent
Grant

(10) Patent No.: US 10,657,021 B2
(45) Date of Patent: May 19, 2020

(54) TRACING PROCESSING ACTIVITY WITH POSITION DATA TO REORDER ITEMS OF TRACE DATA

(71) Applicant: ARM LIMITED, Cambridge (GB)

(72) Inventor: Alasdair Grant, Cambridge (GB)

(73) Assignee: ARM Limited, Cambridge (GB)

( * ) Notice: Subject to any disclaimer, the term of this patent is extended or adjusted under 35 U.S.C. 154(b) by 353 days.

(21) Appl. No.: 15/258,058

(22) Filed: Sep. 7, 2016

(65) Prior Publication Data
US 2018/0067749 A1 Mar. 8, 2018

(51) Int. Cl.
*G06F 11/34* (2006.01)
*G06F 11/30* (2006.01)

(52) U.S. Cl.
CPC ...... *G06F 11/3466* (2013.01); *G06F 11/3024* (2013.01)

(58) Field of Classification Search
CPC .............. G06F 11/323; G06F 11/3466; G06F 11/3471; G06F 11/3636; G06F 11/364; G06F 9/00–3897; G06F 15/00–825
USPC .................................................. 712/227, 45
See application file for complete search history.

(56) References Cited

U.S. PATENT DOCUMENTS

| | | | | |
|---|---|---|---|---|
| 7,043,418 B2* | 5/2006 | Swoboda | ......... | G01R 31/31705 703/28 |
| 2003/0101336 A1* | 5/2003 | Kosche | ............... | G06F 11/3612 712/244 |
| 2004/0177288 A1* | 9/2004 | Swoboda | ............ | G06F 11/3636 714/39 |
| 2006/0224873 A1* | 10/2006 | McCormick, Jr. | ..... | G06F 9/3861 712/244 |
| 2007/0043531 A1* | 2/2007 | Kosche | ............... | G06F 11/3447 702/182 |
| 2008/0250275 A1* | 10/2008 | Walker | ................ | G06F 11/3476 714/45 |
| 2010/0299668 A1* | 11/2010 | Venkumahanti | .... | G06F 11/3632 718/102 |
| 2011/0314340 A1* | 12/2011 | Gilkerson | ............. | G06F 9/3808 714/37 |

(Continued)

OTHER PUBLICATIONS

ARM (CoreSight Program Flow Trace PFTv1.0 and PFTv1.1 Architecture Specification); ARM IHI 0035B (ID060811); 252 pages (Year: 2011).*

(Continued)

*Primary Examiner* — Keith E Vicary
(74) *Attorney, Agent, or Firm* — Nixon & Vanderhye P.C.

(57) ABSTRACT

Data processing apparatus comprises a processing element having an instruction pipeline to execute instructions and trace circuitry to generate items of trace data indicative of processing activities of the processing element. The trace circuitry generates items of event trace data in response to events initiated by execution of corresponding instructions by the instruction pipeline and also generates items of waypoint trace data in response to instructions, in a set of waypoint instructions, reaching a predetermined stage relative to the instruction pipeline. The trace circuitry generates position data, indicating a relative position with respect to execution of the corresponding instructions by the instruction pipeline, of one or more items of event trace data and one or more items of waypoint trace data.

23 Claims, 4 Drawing Sheets

(56) References Cited

U.S. PATENT DOCUMENTS

| | | | | |
|---|---|---|---|---|
| 2012/0185734 A1* | 7/2012 | Gilkerson | ............ | G06F 9/30072 |
| | | | | 714/45 |
| 2013/0073910 A1* | 3/2013 | Venkumahanti | .... | G06F 11/3636 |
| | | | | 714/45 |
| 2015/0143343 A1* | 5/2015 | Weiss | .................. | G06F 11/3668 |
| | | | | 717/128 |

OTHER PUBLICATIONS

ARM (Embedded Trace Macrocell ETMv1.0 to ETMv3.5 Architecture Specification); ARM IHI 0014Q (ID101211); 420 pages (Year: 2011).*

* cited by examiner

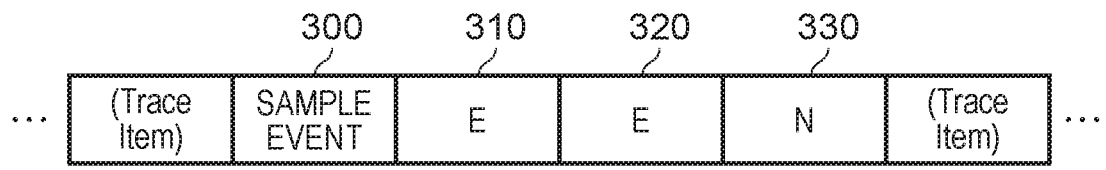
FIG. 3
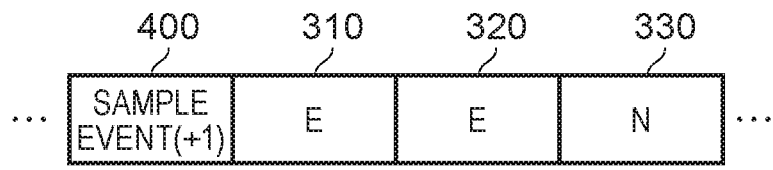
FIG. 4
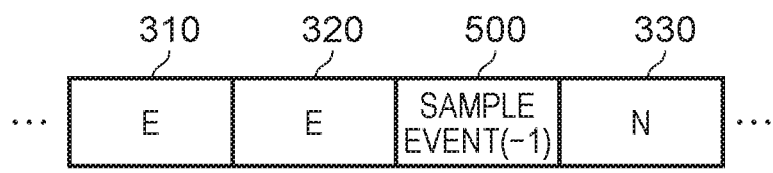
FIG. 5
| SAMPLED DATA | VALUE |
| --- | --- |
| TIMESTAMP | – |
| PC | – |
| LATENCY | – |
FIG. 6
| SAMPLED DATA | VALUE |
| --- | --- |
| TIMESTAMP | – |
| PC | – |
| LATENCY | – |
| OFFSET | +1 |
FIG. 7

TRACING PROCESSING ACTIVITY WITH POSITION DATA TO REORDER ITEMS OF TRACE DATA

BACKGROUND

This disclosure relates to tracing processing activity.

There are a number of occasions where it is desirable to keep track of the processing activities being performed by a processing element such as a central processing unit (CPU). For example, such information is useful during the development of a data processing apparatus. An example of a tool that may be used to assist in such a process is a tracing tool.

Tracing the activity of a processing element whereby a trace stream is generated that includes data representing the step-by-step activity within the system is a highly useful tool in system development. Such tracing tools use a variety of means for tracing the program flow including embedded trace macrocells (ETM, a trademark of ARM Limited, Cambridge) which are present on the chip whose processing is being monitored.

These tracing tools can be used to reconstruct the state of a machine at a certain point during execution of the instruction stream and in order to do this may require knowledge of data transfers to registers if the contents of the registers are to be reconstructed or may require knowledge of data transfers to particular addresses if the memory state is to be reconstructed.

SUMMARY

In an example arrangement there is provided data processing apparatus comprising:

a processing element having an instruction pipeline to execute instructions; and trace circuitry to generate items of trace data indicative of processing activities of the processing element;

the trace circuitry being configured to generate items of event trace data in response to events initiated by execution of instructions by the instruction pipeline and to generate items of waypoint trace data in response to instructions, in a set of waypoint instructions, reaching a predetermined stage relative to the instruction pipeline; and the trace circuitry being configured to generate position data, indicating a relative position with respect to execution of the corresponding instructions by the instruction pipeline, of one or more items of event trace data and one or more items of waypoint trace data.

In another example arrangement there is provided a trace apparatus comprising:

trace circuitry to generate items of trace data indicative of processing activities of a processing element having an instruction pipeline to execute instructions;

the trace circuitry being configured to generate items of event trace data in response to events initiated by execution of instructions by the instruction pipeline and to generate items of waypoint trace data in response to instructions, in a set of waypoint instructions, reaching a predetermined stage relative to the instruction pipeline; and the trace circuitry being configured to generate position data, indicating a relative position with respect to execution of the corresponding instructions by the instruction pipeline, of one or more items of event trace data and one or more items of waypoint trace data.

In another example arrangement there is provided a diagnostic apparatus comprising:

input circuitry to receive a stream of trace data indicative of processing activities of a processing element having an instruction pipeline to execute instructions, the stream of trace data comprising items of event trace data in response to events initiated by execution of instructions by the instruction pipeline and items of waypoint trace data in response to instructions, in a set of waypoint instructions, reaching a predetermined stage relative to the instruction pipeline;

the diagnostic apparatus comprising analysing circuitry responsive to position data, indicating a relative position with respect to execution of the corresponding instructions by the instruction pipeline, of one or more items of event trace data and one or more items of waypoint trace data, to modify the relative order of one or more items of trace data in the stream of trace data.

In another example arrangement there is provided a data processing method comprising:

generating items of trace data indicative of processing activities of a processing element having an instruction pipeline to execute instructions, comprising generating items of event trace data in response to events initiated by execution of instructions by the instruction pipeline and generating items of waypoint trace data in response to instructions, in a set of waypoint instructions, reaching a predetermined stage relative to the instruction pipeline; and generating position data, indicating a relative position with respect to execution of the corresponding instructions by the instruction pipeline, of one or more items of event trace data and one or more items of waypoint trace data.

In another example arrangement there is provided a diagnostic method comprising:

receiving a stream of trace data indicative of processing activities of a processing element having an instruction pipeline to execute instructions, the stream of trace data comprising items of event trace data in response to events initiated by execution of instructions by the instruction pipeline and items of waypoint trace data in response to instructions, in a set of waypoint instructions, reaching a predetermined stage relative to the instruction pipeline; and modifying the relative order of one or more items of trace data in the stream of trace data in response to position data, indicating a relative position with respect to execution of the corresponding instructions by the instruction pipeline, of one or more items of event trace data and one or more items of waypoint trace data.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which:

FIGS. 3 to 5 schematically illustrate example excerpts of a stream of trace data;

FIGS. 6 and 7 schematically illustrate sample data;

DESCRIPTION OF EMBODIMENTS

Figure 1:
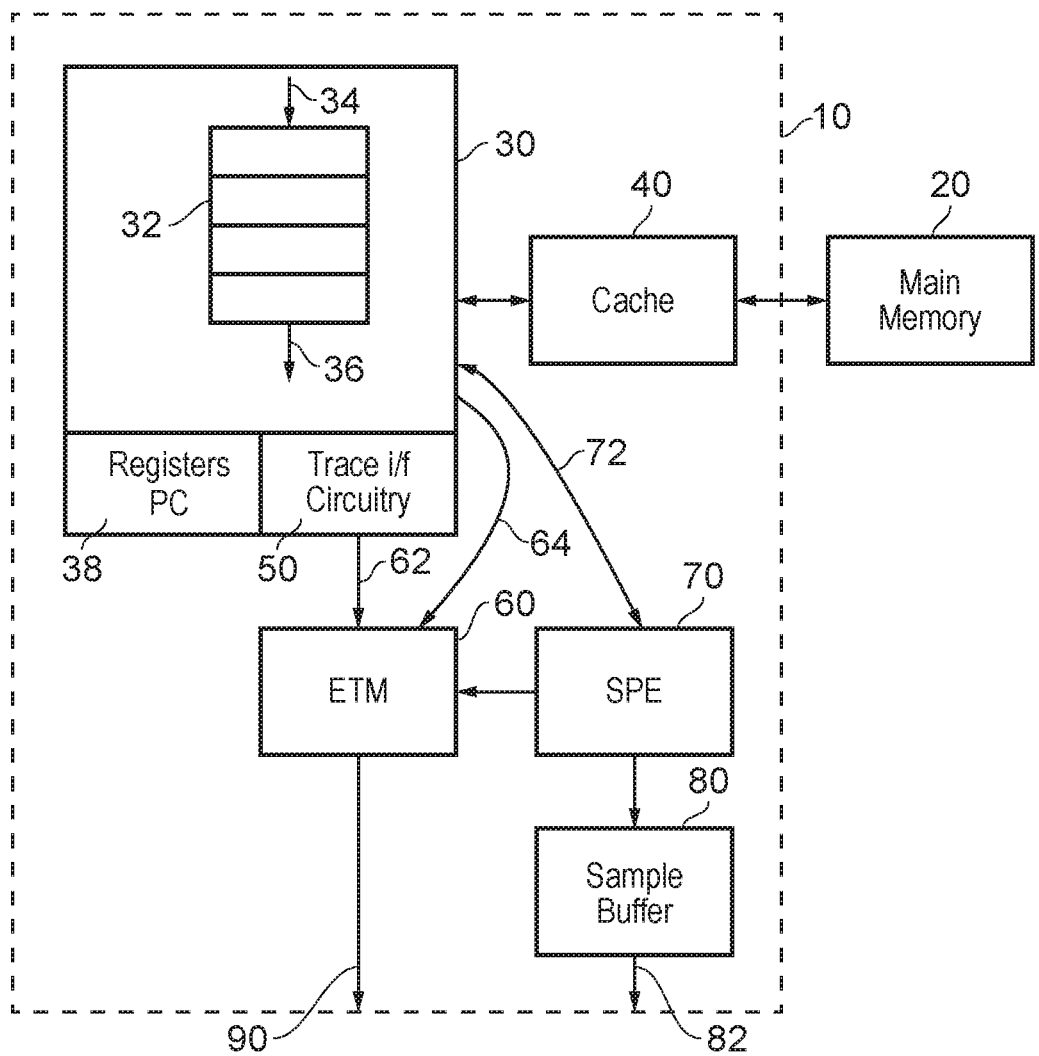
FIG. 1 schematically illustrates a data processing apparatus.

Before discussing the embodiments with reference to the accompanying figures, the following description of embodiments is provided.

An example embodiment provides a data processing apparatus comprising:

a processing element having an instruction pipeline to execute instructions; and trace circuitry to generate items of trace data indicative of processing activities of the processing element;

the trace circuitry being configured to generate items of event trace data in response to events initiated by execution of instructions by the instruction pipeline and to generate items of waypoint trace data in response to instructions, in a set of waypoint instructions, reaching a predetermined stage relative to the instruction pipeline; and the trace circuitry being configured to generate position data, indicating a relative position with respect to execution of the corresponding instructions by the instruction pipeline, of one or more items of event trace data and one or more items of waypoint trace data.

The example embodiments recognise that in an arrangement in which event trace data and waypoint trace data are captured or otherwise generated, there could be instances in which the order of the trace data could be ambiguous or incorrect with respect to the actual order of the underlying events. For example, in situations where the event trace data is generated in response to events initiated by execution of an instruction, whereas waypoint trace data is generated in response to instructions reaching a certain pipeline stage, there could be instances in which an item of event trace data is generated before or after its true position (according to the sequence of instruction execution, for example) relative to waypoint trace data.

The example embodiments address this potential issue by also providing position data, indicating a relative position with respect to execution of the corresponding instructions by the instruction pipeline, of one or more items of event trace data and one or more items of waypoint trace data.

The position data can be used, for example, as part of a diagnostic process to reorder the items of trace data in order to correspond to (for example) an actual order of instruction execution. This can potentially make the trace data and its analysis much more useful in that the items of trace data can be considered in their correct original order.

In examples, the trace circuitry is configured to interleave the items of event trace data and the items of waypoint trace data in a serial output stream of items of trace data. This makes it particularly useful to be able to reconstruct the appropriate order of the items of trace data using the techniques discussed here. In examples, the position data is indicative of an offset, within the serial stream of items of trace data, of an item of event trace data relative to items of waypoint trace data in the stream. For example, the position data may be indicative of the offset as a number of items of trace data within the serial stream of items of trace data.

In examples, each item of event trace data has associated position data.

One example way in which the position data can be defined (from the data processing apparatus side) and used (from the diagnostic apparatus side) is as follows: the position of a given item of event trace data in the serial stream relative to nearby items of waypoint trace data, when modified by position data associated with that given item of event trace data, indicates the position, within a sequence of instruction execution by the instruction pipeline, of the instruction for which that given item of event trace data was generated, relative to instructions for which those nearby items of waypoint trace data were generated.

In embodiments the processing element is configured to detect an event for which an item of event trace data can be generated by the trace circuitry and to indicate the detection of an event to the trace circuitry. This allows the trace circuitry then to act on the detection to generate an item of trace data.

A convenient way of establishing appropriate position data is for the processing element to detect one or both of: (i) a number of instructions in the set of waypoint instructions which are older than the instruction which triggered the event but which have not yet reached the predetermined stage relative to the instruction pipeline, and (ii) a number of instructions in the set of waypoint instructions which are younger than the instruction which triggered the event and which have already reached the predetermined stage relative to the instruction pipeline; and for the trace circuitry to generate the position data in response to the number of instructions detected by the processing element.

Another example of an event which can lead to the generation of event trace data is found in an arrangement in which the trace circuitry comprises instruction sampling circuitry to generate a sample of information relating to the execution of a given instruction; and the processing element is configured to detect the generation of a sample of information relating to the execution of the given instruction as an event for which an item of event trace data relating to that given instruction can be generated by the trace circuitry.

In examples, the trace circuitry is configured to associate the position data, for an item of event trace data indicating the generation of a sample of information relating to the execution of a given instruction, with the generated sample of information. In order to associate the position data with the sampling process to which it relates, in examples the trace circuitry is configured to include the position data as part of the generated sample of information.

An elegantly convenient approach which allows the trace data to be easily associated with the position data is one in which the position data is included with the serial stream of trace data.

In some examples, there could be a discrepancy (benefiting from the generation of position data to allow later reordering by a diagnostic apparatus or process) introduced by the timing mechanism discussed above and separately by sampling process, which could (for example) impose a delay before triggering the event corresponding to a sample generation. In such instances the two timing corrections can conveniently be handled separately, so that the trace circuitry is configured to associate first partial position data, for a given item of event trace data indicating the generation of a sample of information relating to the execution of a given instruction, with the generated sample of information and to include second partial position data in the serial stream of trace data, the position data for the given item of event trace data being a combination of the first and second partial position data.

The predetermined pipeline stage could be, for example, a "commit" stage, but in examples the predetermined stage relative to the instruction pipeline is retirement of the instruction from the instruction pipeline.

The waypoint instructions can be defined to include various types of instructions. In examples, the same definition of waypoint instruction can be used, as between the data processing apparatus and the diagnostic apparatus. In examples the set of waypoint instructions comprises a category of instructions selected from the list consisting of:

instructions which can change program flow;

instructions which can change program flow and barrier instructions; and all instructions.

Another example embodiment provides a trace apparatus comprising:

trace circuitry to generate items of trace data indicative of processing activities of a processing element having an instruction pipeline to execute instructions;

the trace circuitry being configured to generate items of event trace data in response to events initiated by execution of instructions by the instruction pipeline and to generate items of waypoint trace data in response to instructions, in a set of waypoint instructions, reaching a predetermined stage relative to the instruction pipeline; and the trace circuitry being configured to generate position data, indicating a relative position with respect to execution of the corresponding instructions by the instruction pipeline, of one or more items of event trace data and one or more items of waypoint trace data.

Another example embodiment provides a diagnostic apparatus comprising:

input circuitry to receive a stream of trace data indicative of processing activities of a processing element having an instruction pipeline to execute instructions, the stream of trace data comprising items of event trace data in response to events initiated by execution of instructions by the instruction pipeline and items of waypoint trace data in response to instructions, in a set of waypoint instructions, reaching a predetermined stage relative to the instruction pipeline;

the diagnostic apparatus comprising analysing circuitry responsive to position data, indicating a relative position with respect to execution of the corresponding instructions by the instruction pipeline, of one or more items of event trace data and one or more items of waypoint trace data, to modify the relative order of one or more items of trace data in the stream of trace data.

As discussed above, in examples, the position of a given item of event trace data in the serial stream relative to nearby items of waypoint trace data, when modified by the diagnostic apparatus in response to position data associated with that given item of event trace data, represents the position, within a sequence of instruction execution by the instruction pipeline, of the instruction for which that given item of event trace data was generated, relative to instructions for which those nearby items of waypoint trace data were generated.

In examples, the input circuitry is configured to receive successive samples of information each relating to the execution of a respective instruction by the processing element, each sample of information having an associated item of event trace data. Although in some examples the position data could be encoded with the items of event trace data, in other examples the position data relating to an item of event trace data associated with a given sample of information is included as part of that given sample of information.

An example of the way in which such data can be used is as follows. In examples, the samples of information include a sample of a program counter register of the processing element; and the analysing circuitry is configured to detect a particular instruction, to which the sample of information relates, from the sample of the program counter register and the modified relative order of the items of trace data. This can allow particular instances of instructions (for which sample data has been generated, even if the instructions are in a loop or other repetitive program flow), even in situations where instruction-specific tracing is not provided.

Another example embodiment provides a data processing method comprising:

generating items of trace data indicative of processing activities of a processing element having an instruction pipeline to execute instructions, comprising generating items of event trace data in response to events initiated by execution of instructions by the instruction pipeline and generating items of waypoint trace data in response to instructions, in a set of waypoint instructions, reaching a predetermined stage relative to the instruction pipeline; and generating position data, indicating a relative position with respect to execution of the corresponding instructions by the instruction pipeline, of one or more items of event trace data and one or more items of waypoint trace data.

Another example embodiment provides a diagnostic method comprising:

receiving a stream of trace data indicative of processing activities of a processing element having an instruction pipeline to execute instructions, the stream of trace data comprising items of event trace data in response to events initiated by execution of instructions by the instruction pipeline and items of waypoint trace data in response to instructions, in a set of waypoint instructions, reaching a predetermined stage relative to the instruction pipeline; and modifying the relative order of one or more items of trace data in the stream of trace data in response to position data, indicating a relative position with respect to execution of the corresponding instructions by the instruction pipeline, of one or more items of event trace data and one or more items of waypoint trace data.

Referring now to the drawings, FIG. 1 schematically illustrates a data processing apparatus 10 connected to a main memory 20. The data processing apparatus 10 comprises a processing element 30 (such as a central processing unit or CPU core) which can access data and/or instructions in a cache 40 and/or the main memory 20. The processing element 30 comprises an instruction execution pipeline 32 which is drawn schematically such that instructions enter the pipeline at the top 34 as drawn and exit the pipeline (a process referred to as "retiring" the instructions) at the bottom 36 as drawn. A four-stage pipeline is drawn purely as a schematic example. It will be appreciated that pipelines having other numbers of stages can be used and indeed, in some examples, a one-stage pipeline could be envisaged. The processing element 30 stores a number of registers including a program counter (PC) register in a register memory area 38 and also provides trace interface circuitry 50 for interacting with other parts of trace apparatus to be described below.

The processing element 30 therefore provides an example of a processing element having an instruction pipeline (32) to execute instructions.

Other features of the arrangement shown in FIG. 1 provide the ability to generate and output trace data indicative of processing activities of the processing element 30. As well as the trace interface circuitry provided as part of the processing element 30, further trace circuitry is used in the form of an embedded trace macrocell (ETM) 60 and optionally a sampling profile extension (SPE) circuitry 70 and a sample buffer 80. The items 50, 60, 70 and 80 may all be considered as part of the overall trace circuitry provided in the apparatus of FIG. 1. These items cooperate to provide the trace functionality to be discussed further below. This functionality includes generating items of trace data indicative of processing activities of the processing element, which may include generating items of event trace data in response to events initiated by execution of instructions by the instruction pipeline 32 and the generation of items of waypoint trace data in response to instructions, in a set of waypoint instructions, reaching a predetermined stage relative to the instruction pipeline.

As further background, the processing element 30 executes a stream of instructions using the instruction pipeline 32. As mentioned above, these instructions enter the pipeline and are eventually retired from the pipeline once their execution has been fully completed. Some of the instructions may be classified as so-called waypoint instructions. Examples of waypoint instructions comprise instructions selected from the list consisting of: instructions which can change program flow; instructions which can change program flow and barrier instructions; and all instructions.

Considering instructions which can change program flow, these comprise in the present examples instructions which are capable of writing to the PC register in order to change the program counter of the processing element 30. The PC defines a next instruction to be executed and so a change to the PC causes a change to program flow. However, some instructions of this nature are capable of writing to the PC but do not always do so. An example is a so-called conditional branch instruction which causes a change to the PC, or alternatively no change to the PC, in dependence upon the outcome of a condition. An example is a BNE (branch if not equal) instruction which causes a branch to a new address to be carried out if a "zero flag" is clear. If the zero flag is not clear then the branch is not taken and execution continues with the instruction following the BNE instruction. The zero flag may be set by a previous operation. So, the BNE instruction can cause a branch but need not always do so. However, in the present examples it is classified as a waypoint instruction because it has the capability of changing the PC value. Other instructions which have such a capability are included within the set of waypoint instructions.

A so-called barrier instruction is used to inhibit the reordering of instructions for execution. As background, some processing elements can only execute instructions and complete data accesses in a strict program order. Other processing elements however can change the order of instruction execution and data access, for example to improve efficiency of operation. A barrier instruction may be inserted into the instruction stream to prevent reordering of instructions across the position of the barrier instruction. That is to say, any instructions and data accesses occurring before the barrier instruction in the program flow have to be completed before the program flow can move on to instructions and data accesses occurring after the barrier instruction. The term "barrier instruction" may be defined (for the purposes of the present discussion) to include all instructions which inhibit reordering, or may be defined to include some types of instruction which inhibit reordering but to exclude some other types of instruction which inhibit reordering.

In another example, all instructions could be considered to be waypoint instructions. This might be the case in, for example, simpler trace solutions which generate an item of trace data for each instruction but where there is still an imprecisely indicated relationship of events relative to instruction items. The techniques described here can improve the precision of this timing relationship.

In the present examples the set of waypoint instructions include all instruction types which are capable of writing to the PC and some or all types of barrier instructions. However, other sets of waypoint instructions could be defined, for example including only instructions which are capable of writing to the PC, or including other categories of instruction and so on. The definition of which instruction types fall into the category of waypoint instructions is shared (for example, as predetermined settings or data) between the trace circuitry and analysis/diagnostic circuitry or apparatus (which will be discussed below with reference to FIG. 2) so that the analysis/diagnostic apparatus can detect which instructions in the program code have been recognised by the trace circuitry as waypoint instructions.

In some examples the ETM 60 generates indications, for output as items of trace data on a trace data output 90, that a waypoint instruction has been encountered, for example in response to information passed to the ETM 60 by the trace interface circuitry 50 by a link or connection 62. This is an example of the processing element being configured to detect an event for which an item of event trace data can be generated by the trace circuitry and to indicate the detection of an event to the trace circuitry. These may be expressed as so-called E and N atoms, where an atom is a small amount of data (for economy of storage of the trace data) indicating either:

that the waypoint caused a program flow change (an E atom is output); or that the waypoint did not cause a program flow change (an N atom is output).

Atoms can be output by the ETM in the form of atom packets, and a packet may contain one or more atoms. The atoms, as examples of items of waypoint trace data, are generated in response to the waypoint instruction reaching a predetermined stage relative to the instruction pipeline. In the present examples, the predetermined stage relative to the instruction pipeline is retirement of the instruction from the instruction pipeline. However, in other examples a different predetermined stage could be used such as the instruction reaching a so-called "commit" stage.

If a barrier instruction is included in the set of waypoint instructions it can be traced as an E atom.

The trace circuitry is also configured to generate items of event trace data in response to events initiated by execution of instructions by the instruction pipeline.

Events are communicated from the processing element 30 to the ETM 60 by an event bus 64. The event bus can carry indications of many different types of event. In some examples, a total number of events communicated by the event bus 64 may be of the order of 100 event types. Of these, the ETM 60 can, by configuration settings, select a subset of some or all of these event types which are of interest for reporting as event trace data. In examples, the ETM 60 maps the selected event types to a number of event indications which can be communicated as event trace data. For example, there may be four event indications (1 . . . 4) with event types of the event bus 64 of interest being mapped to a respective one of the four event indications. The event indications are then communicated as event trace data. Examples of traceable events of this nature include:

an event indicating that a load/store instruction is using, has used or has attempted to use an unaligned address; and/or an event indicating that a branch in program flow is mispredicted (that is to say, that branch prediction arrived at an incorrect prediction); and/or an event indicating a load/store miss in a cache memory.

The tracing of waypoints and events discussed so far can operate without the SPE 70 and the sample buffer 80. Embodiments of the present disclosure need not have the SPE 70 or the sample buffer 80 present. However, the relevance of the SPE 70 and the sample buffer 80 to a particular type of event tracking will now be discussed.

The SPE 70 provides a facility to take a so-called sample of one or more data items relating to the processing activities of the processing element 30. The sample may comprise a snapshot of those data items and is stored in the sample buffer 80 for output on an output 82. The sampling could be triggered by the execution of a particular instruction type or by another condition. However, in examples the SPE 70 initiates a sampling process in response to execution of an instruction (for example, by selecting an instruction on a periodic or pseudo-random basis, such as every 1000$^{th}$ instruction, and optionally also checking that the selected instruction is of a certain category of instructions defined by predetermined configuration data of the SPE 70) and communicates this to the processing element 30 via a connection 72. In response, the processing element 30 returns data values appropriate to the sampling process to the SPE 70, again by the connection 72 in FIG. 1. The SPE 70 also indicates to the ETM 60 that a sample is taking place and the ETM 60 records this as an event in the event trace data. The SPE 70 assembles the sample in the sample buffer 80 and it is then output on the output 82.

Therefore, in examples, the trace circuitry comprises instruction sampling circuitry to generate a sample of information relating to the execution of a given instruction and the processing element is configured to detect the generation of a sample of information relating to the execution of the given instruction as an event for which an item of event trace data relating to that given instruction can be generated by the trace circuitry.

So, in principle, at an analysis stage, the taking of a sample is indicated by event trace data produced by the ETM 60 and the sample itself is available from the output 82. These two occurrences can be associated with one another by the order in which they occur (which is to say, a next sample process recorded as an item of event trace data will correspond to a next set of sampled data). In alternatives, the item of event trace data could include an index to the appropriate sample data.

A timing issue between the waypoint trace data and the event trace data will now be discussed. This issue can apply to the various types of event tracing including the tracing of an event relating to the taking of a sample by the SPE 70, discussed above.

Previously proposed arrangements do not provide a mechanism for identifying precisely which instance of an instruction execution corresponds to an event.

Suppose in the following code representing a looped operation the second execution of instruction 0004 triggers an event:

```
0000    mov  r1,#3
0004    strb r0,[r2,r1]
0008    subs r1,#1
000c    bne  0004
```

Here, "mov" is a move operation, "strb" is a store register operation with the "b" suffix representing an unsigned byte operation, "subs" is a subtract operation with the "s" suffix indicating that the condition code flags (including the zero flag) are updated in response to the outcome, and "bne", as discussed above, is a branch operation conditional on the zero flag. The branch, if taken in response to the zero flag, will return program flow to the PC value of 0004.

In an example operation this code will execute the following sequence of instructions, with corresponding trace atoms:

```
0000    mov  r1,#3
0004    strb r0,[r2,r1]
0008    subs r1,#1
000c    bne  0004              // E atom
0004    strb r0,[r2,r1]        // Instruction X (see below)
0008    subs r1,#1
000c    bne  0004              // E atom
0004    strb r0,[r2,r1]
0008    subs r1,#1
000c    bne  0004              // N atom
0010    ...
```

The atom sequence is E,E,N. This may be output as a single trace packet or several.

Suppose an event occurs that is associated with instruction X and the occurrence of this event is indicated within the trace, by an event packet. For example, assume that the event is a sampling process by the SPE 70, and that there exists a mechanism such as that described above for matching events with samples, or in other words to know at the later analysis stage which sample the event packet corresponds to. The sample will capture X's static address (0004) but that does not identify which execution of the instruction was sampled. This makes it hard to present the sample usefully to an end-user in the context of the instruction trace. (Event timestamps are typically not of sufficient resolution to distinguish between loop iterations, and the trace may be using a different time base from the sampling mechanism anyway.)

Locating the event precisely in the instruction trace is complicated for several reasons:

there may be a timing skew or delay in the core, between the signalling of the event and the signalling of the waypoints that bracket the event—the event might be signalled before the waypoint corresponding to an earlier branch, or it might be signalled after a waypoint corresponding to a later branch several waypoints may be signalled in the same cycle (if a core can retire more than one branch per cycle)

the ETM may indicate several waypoints in a single trace packet.

The ideal outcome would be a trace where the event occurs in correct sequence: E, SAMPLE_EVENT, E, N But the core might signal the event out of sequence and it could be difficult for the core or ETM to insert the event trace packet in correct sequence.

Even if the core indicated the event to ETM in correct sequence with the waypoints, the ETM does not necessarily explicitly require it to be output in sequence—in examples, the ETM may allow event packets to be output up to some number of waypoints after the event. It might be possible to trace the event in correct sequence with respect to waypoint events, dealing with the wide core problem, but there remains the problem of possible skew between the SPE's signalling of the event and its signalling of the waypoints bracketing the event's instruction.

Another example of a potential timing issue is as follows. In example embodiments, items of waypoint trace data are generated in response to waypoint instructions reaching a predetermined stage in the instruction pipeline. As mentioned above, an example of such a predetermined stage is instruction retirement. Another example is instruction commit. However, items of event trace data are generated in response to events relating to instruction execution, which can mean that the generation of event trace data is triggered while the instructions are at an earlier stage in the pipeline. This can contribute to timing discrepancies in the generation of trace data items by the ETM and the actual processing or program flow order of the corresponding instructions.

Technical features of the present embodiments which can address these issues are discussed below.

Figure 2:
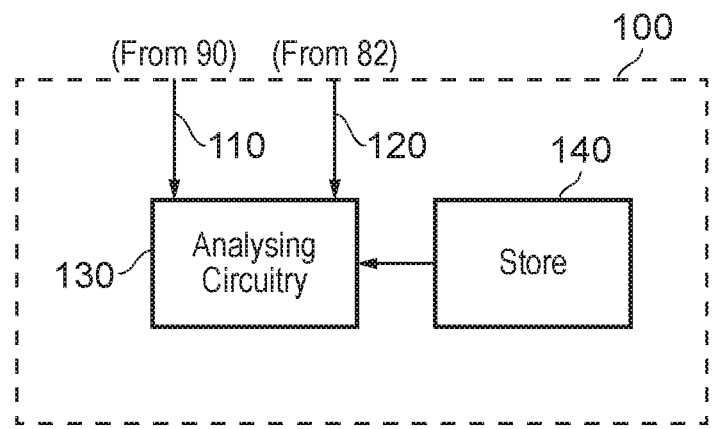
FIG. 2 schematically illustrates a diagnostic apparatus.

FIG. 2 schematically illustrates an analysis or diagnostic apparatus 100 for receiving the items of trace data and, if provided, sample data from the data processing apparatus 10 of FIG. 1 and for analysing them. The diagnostic apparatus 100 has input circuitry comprising one or both of an input 110 for receiving the trace data and an input 120 for receiving the sample data, and analysing circuitry 130 which acts to analyse the items of trace data to deduce information about processing activities of the processing element.

The input 120 (as an optional part of the input circuitry) represents an example of the input circuitry being configured to receive successive samples of information each relating to the execution of a respective instruction by the processing element, each sample of information having an associated item of event trace data.

In some examples, the analysing circuitry 130 makes use of information about which instructions in the instruction stream are being executed by the processing element so that it can relate the items of trace data as received to the corresponding instructions. This type of analysis process could happen in real time or could happen using stored trace data and sample data. To hold such information about the instruction stream, a data store 140 is provided. The data store 140 may hold a program image so that analysing circuitry 130 can determine from this program image the instructions to which particular trace elements or items of trace data relate. In other example embodiments, however, rather than storing the instructions, the diagnostic apparatus can query the processing element in real time to establish what instruction the processing element is executing or has just executed at a time of relevance to the track data.

FIGS. 3-5 schematically illustrate example excerpts of a stream of trace data.

The trace circuitry of FIG. 1 including the ETM 60, is configured to interleave items of event trace data and items of waypoint trace data in a serial output stream (at the output 90) of items of trace data. FIG. 3 shows six items of trace data within such a stream, with an older (less recent) item being drawn at the left side of FIG. 3 and a younger (more recent) item being drawn at the right side of FIG. 3. Items of interest in FIG. 3 in connection with the present discussion include an item of event trace data 300 relating to a sample process, first and second E atoms 310, 320 and an N atom 330. The other two items shown in FIG. 3 may be any type of trace data and are not relevant to the particular example discussion provided here.

The example given above of tracing execution of a section of program code showed that the sample event trace data relates to a sampling event occurring between the two E atoms 310, 320, but because of timing issues relating to the generation of the various types of trace data, in the example of FIG. 3 the sample event appears first in the stream of trace data followed by the two E atoms.

To address this, the trace circuitry of FIG. 1 including the ETM 60 is configured to generate position data, indicating a relative position with respect to execution of the corresponding instructions by the instruction pipeline 32 of one or more items of event trace data and one or more items of waypoint trace data. Examples of this technique will be described below.

In some examples, the number of waypoints before or after an event packet (an item of event trace data) can be encoded to indicate the position in the instruction stream at which the event's instruction actually occurred. This can allow an analysis or diagnostic apparatus to precisely locate the event's corresponding instruction within the stream of waypoint trace data. Two examples of how to achieve this are shown in FIGS. 4 and 5, in which the event trace data (400 in FIG. 4) has associated with it an offset value, in this example a value of +1, to indicate that the event being traced relates to one atom later in the stream of trace data, which is to say the event occurred between the E atom 310 and the E atom 320. The offset value can be encoded as part of the packet or data value encoding the event itself, so the offset is present in the stream of trace data with the corresponding event indication.

In FIG. 5, again because of the sort of timing issues discussed above, the sample event has appeared in the stream of trace data after its appropriate position relative to the waypoint trace data. The sample event 500 in FIG. 5 has an associated offset value of −1 to indicate that its appropriate position with reference to the waypoint trace data is one atom earlier, again which indicates a position between the E atom 310 and the E atom 320.

Note that the offset values may be greater than one in their magnitude, that the offset may be zero if the event is at its correct place in the stream relative to surrounding waypoint trace data, and that in some circumstances the offset value may be encoded as "don't know" if it is impossible for the ETM 60 to establish what the correct offset is for a particular event.

An alternative arrangement is to include the offset within the sample data itself, for use with examples where the event under consideration is a sampling event. FIG. 6 schematically illustrates sampled data as generated by the SPE 70 and assembled in the sample buffer 80. Many types of information relating to processing activity can be sampled and three data types are provided in FIG. 6 purely as illustrative examples, these being a time stamp, a current value of the PC and a latency relating to a data access operation. These can be encoded in the sample data using indications of the data type (for example, encoded versions of the left hand column of FIG. 6 as well as the corresponding value in the right hand column of FIG. 6) or the data type can be inferred by the position of the data within the sample data.

FIG. 7 schematically illustrates another example of sampled data, this time including a field for an offset value (where an example value of +1 is shown).

The offset value discussed above provides an example of the position data being indicative of an offset, within the serial stream of items of trace data, of an item of event trace data relative to items of waypoint trace data in the stream. The offset may be indicative of a number of items of trace data within the serial stream of items of trace data.

As mentioned above, in some examples, each item of event trace data can have associated position data, even if that position data indicates a value of zero as an offset, or in some circumstances a value of "don't know" as an offset.

The offset arrangements discussed with reference to FIGS. 4, 5 and 7 are such that the position of a given item of event trace data (such as the event 300, shown in FIGS. 4 and 5 as an event 400, 500) in the serial stream relative to nearby items of waypoint trace data 310, 320, 330, when modified by position data (+/−1) associated with that given item of event trace data, indicates the position within a sequence of instruction execution by the instruction pipeline, of the instruction for which that given item of event trace data was generated, relative to instructions for which those nearby items of waypoint trace data were generated.

Considering the various techniques for encoding the position data discussed above, in examples the trace circuitry of FIG. 1 is configured to associate the position data, for an item of event trace data indicating the generation of a sample of information relating to the execution of a given instruction, with the generated sample of information. In some examples, the trace circuitry is configured to include the position data as part of the generated sample of information, for example as shown in FIG. 7. This provides an example of the position data relating to an item of event trace data associated with a given sample of information being included as part of that given sample of information. In other examples, the position data is included with the serial stream of trace data, for example as shown in FIGS. 4 and 5.

Figure 8:
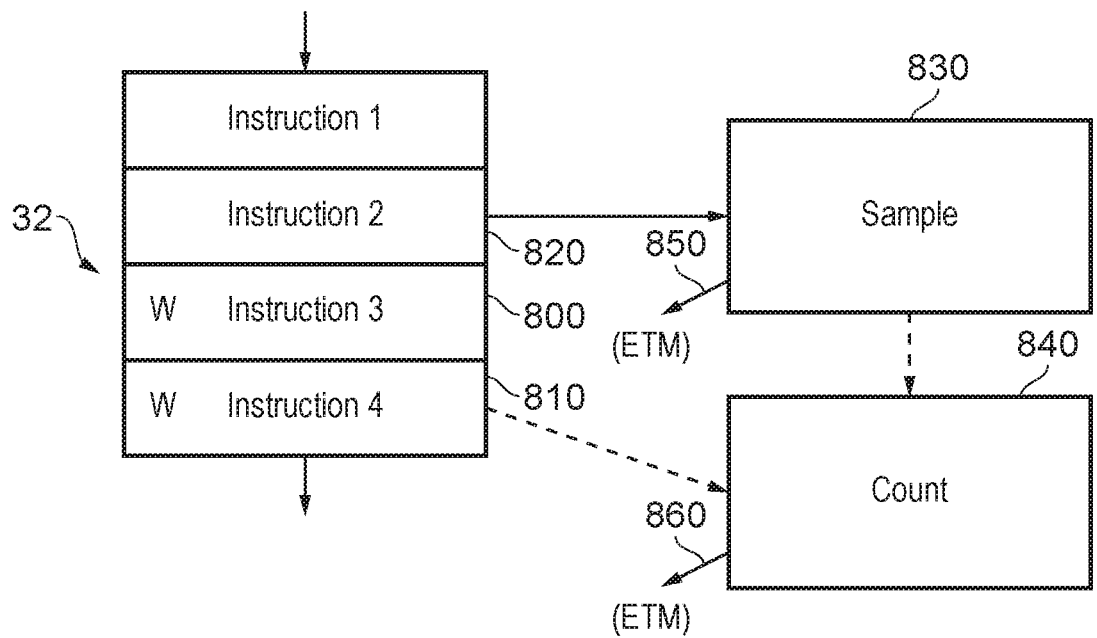
FIG. 8 schematically illustrates part of the operation of a data processing apparatus.

FIG. 8 schematically illustrates part of the operation of the data processing apparatus of FIG. 1.

A representation of the instruction pipeline 32 is provided in which older instructions 800, 810 are waypoint instructions (indicated schematically in FIG. 8 by the letter W), and a younger instruction 820 is one which triggers a sampling process by the SPE 70, the sampling process being shown schematically by a box 830. A counting process 840 (for example, implemented by the processing element 30, for example by the trace interface circuitry 50) is used to establish what the offset should be in a manner to be described below with reference to a flowchart of FIG. 9.

Figure 9:
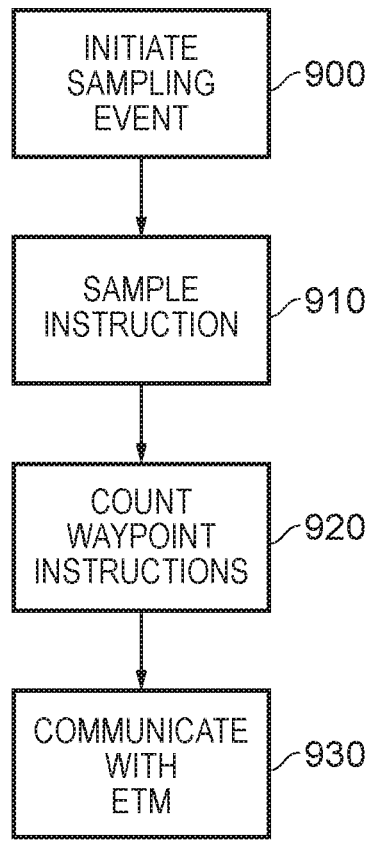
FIG. 9 is a schematic flowchart illustrating the operations of FIG. 8.

Referring to FIG. 9, a sampling event is initiated at a step 900 and the instruction 820 is sampled at a step 910.

In some examples, the sampling process 830 might indicate the event to the ETM (shown schematically in FIG. 8 as an indication 850) upon initiation of the sampling event. In these examples, the number of older waypoint instructions is relevant to the counting process, and the counting process 840 (corresponding to a step 920 in FIG. 9) counts the number of older waypoint instructions 800, 810 and generates the offset by starting with an offset value of zero, and adding one for every untraced waypoint instruction older than the instruction triggering the event trace data (such as the sampled instruction).

In other examples, the sampling process 830 might indicate the event to the ETM 850 upon completion of the sampling, in which case the counting process 840 (corresponding to a step 920 in FIG. 9) counts the number of younger waypoint instructions which have already been traced and generates the offset by starting with an offset value of zero, and adding one for every already-traced waypoint instruction younger than the instruction triggering the event trace data (such as the sampled instruction).

A generic count process 840 may include these two types of operation.

Finally, the count process 840 communicates 860 with the ETM or the SPE as the case may be (depending on how the position data is being communicated) at a step 930 to indicate the offset value to be included or associated with the event.

This process therefore provides an example of the processing element and/or the trace circuitry detecting one or both of a number of instructions in the set of waypoint instructions which are older than the instruction which triggered the event but which have not yet reached the predetermined stage relative to the instruction pipeline, and a number of instructions in the set of waypoint instructions which are younger than the instruction which triggered the event and which have already reached the predetermined stage relative to the instruction pipeline. The trace circuitry is configured to generate the position data in response to the number of instruction detected in this way.

In further examples, both the ETM and the SPE of FIG. 1 could introduce separate respective data skews or timing deviations and so in further examples two or more sets of partial position data can be provided, for example one with the event trace data item packet and one with the sample data itself. In such examples the trace circuitry is configured to associate first partial position data, for a given item of event trace data indicating the generation of a sample of information relating to the execution of a given instruction, with the generated sample of information and to include second partial position data in the serial stream of trace data, the position data for the given item of event trace data being a combination of the first and second partial position data values.

Taking these different types of data into account, the diagnostic apparatus of FIG. 2 has input circuitry comprising at least an input 110 to receive a stream of trace data indicative of processing activities of the processing element 30 having an instruction pipeline 32 to execute instructions, the stream of trace data comprising items of event trace data in response to events initiated by execution of instructions by the instruction pipeline and items of waypoint trace data in response to instructions, in a set of waypoint instructions, reaching a predetermined stage relative to the instruction pipeline. The diagnostic apparatus comprises analysing circuitry responsive to position data, indicating a relative position with respect to execution of the corresponding instructions by the instruction pipeline, of one or more items of event trace data and one or more items of waypoint trace data, to modify the relative order of one or more items of trace data in the stream of trace data.

For example, the diagnostic apparatus can reorder the trace data items according to the position data, for further analysis and/or for presentation to an end-user. This provides the facility to analyse the trace data in an order corresponding to the actual execution of the corresponding instructions.

It is noted also that the trace circuitry of FIG. 1 can in itself be considered as an embodiment of the present disclosure. That is to say, the trace circuitry could be implemented as a separate item connectable to a processing element.

Figures 10, 11:
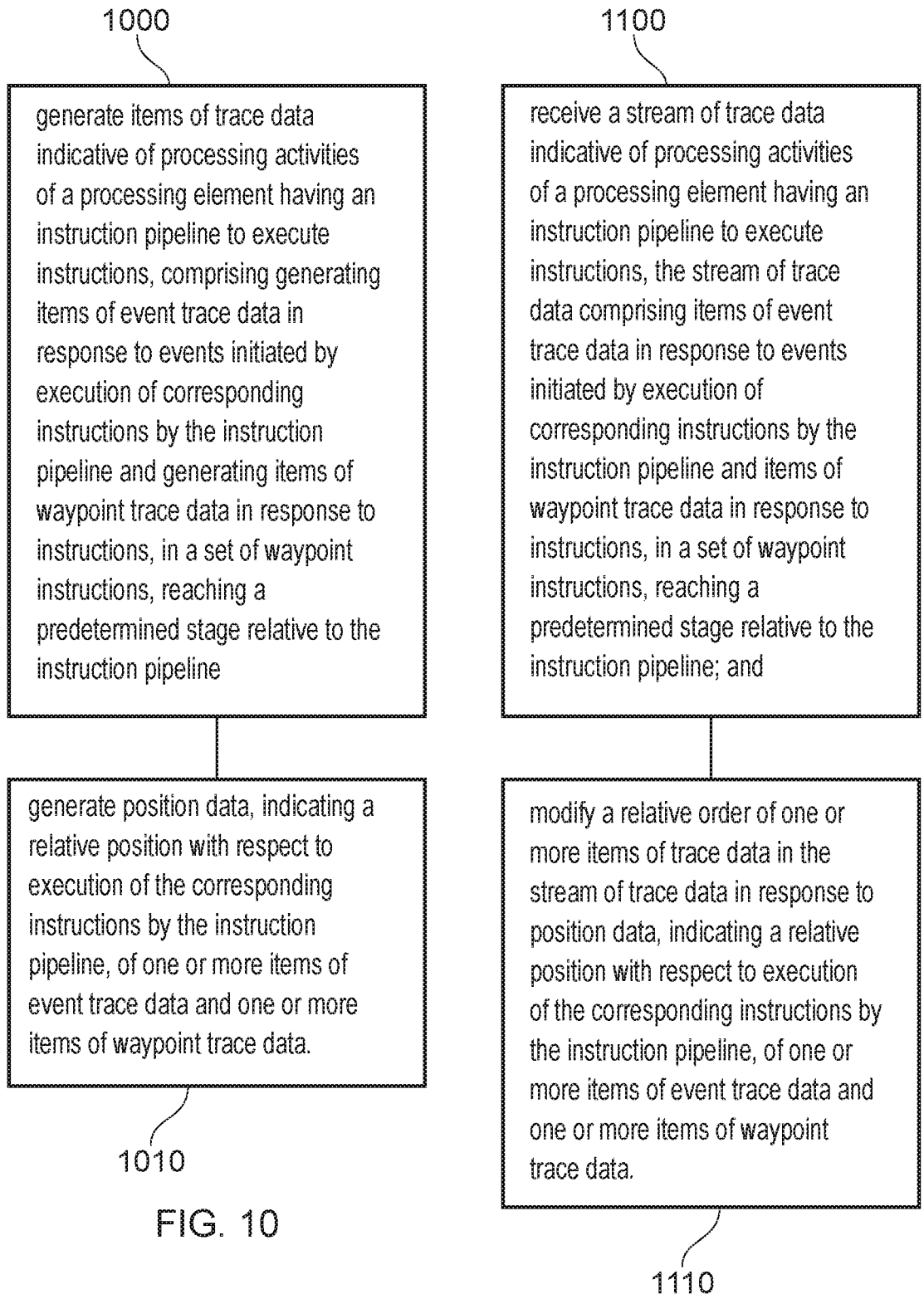
FIGS. 10 and 11 are schematic flowcharts of methods.

FIG. 10 is a schematic flowchart illustrating a data processing method (for example carried out by the apparatus of FIG. 1) comprising:

generating (at a step 1000) items of trace data indicative of processing activities of a processing element having an instruction pipeline to execute instructions, comprising generating items of event trace data in response to events initiated by execution of instructions by the instruction pipeline and generating items of waypoint trace data in response to instructions, in a set of waypoint instructions, reaching a predetermined stage relative to the instruction pipeline; and generating (at a step 1010) position data, indicating a relative position with respect to execution of the corresponding instructions by the instruction pipeline, of one or more items of event trace data and one or more items of waypoint trace data.

FIG. 11 is a schematic flowchart illustrating a diagnostic method (for example carried out by the apparatus of FIG. 2) comprising:

receiving (at a step 1100) a stream of trace data indicative of processing activities of a processing element having an instruction pipeline to execute instructions, the stream of trace data comprising items of event trace data in response to events initiated by execution of instructions by the instruction pipeline and items of waypoint trace data in response to instructions, in a set of waypoint instructions, reaching a predetermined stage relative to the instruction pipeline; and modifying (at a step 1110) the relative order of one or more items of trace data in the stream of trace data in response to position data, indicating a relative position with respect to execution of the corresponding instructions by the instruction pipeline, of one or more items of event trace data and one or more items of waypoint trace data.

As discussed with reference to FIGS. 6 and 7, in example arrangements the samples of information include a sample of a program counter register of the processing element. This then allows the analysing circuitry of FIG. 2 to be configured to detect a particular instruction, to which the sample of information relates, from the sample of the program counter register and the modified relative order of the items of trace data. An example is the identification of the instruction X in the worked example given above, which is possible given the PC (0004) and the correct order of the sample event with respect to the waypoint events.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device (such as the processing element 12) may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

I claim:

1. Data processing apparatus comprising:
a processing element having an instruction pipeline to execute instructions; and
trace circuitry to generate items of trace data indicative of processing activities of the processing element;
the trace circuitry being configured to generate items of event trace data in response to events initiated by execution of corresponding instructions by the instruction pipeline and to generate items of waypoint trace data in response to instructions, in a set of waypoint instructions, reaching a predetermined stage relative to the instruction pipeline; and
the trace circuitry being configured to generate position data indicating a position of a given item of event trace data relative to one or more items of waypoint trace data within a sequence of instruction execution by the instruction pipeline.

2. Data processing apparatus according to claim 1, in which the trace circuitry is configured to interleave the items of event trace data and the items of waypoint trace data in a serial output stream of items of trace data.

3. Data processing apparatus according to claim 2, in which the position data is indicative of an offset, within a serial stream of items of trace data, of the given item of event trace data relative to items of waypoint trace data in the serial stream of items of trace data.

4. Data processing apparatus according to claim 3, in which the position data is indicative of the offset as a number of items of waypoint trace data within the serial stream of items of trace data.

5. Data processing apparatus according to claim 3, in which said trace circuitry is configured to generate position data associated with each item of event trace data.

6. Data processing apparatus according to claim 5, in which a position of the given item of event trace data in the serial stream of items of trace data relative to items of waypoint trace data, when modified by position data associated with that given item of event trace data, indicates a position, within the sequence of instruction execution by the instruction pipeline, of an instruction for which that given item of event trace data was generated, relative to instructions for which those items of waypoint trace data were generated.

7. Data processing apparatus according to claim 5, in which the processing element is configured to detect an event for which an item of event trace data can be generated by the trace circuitry and to indicate the detection of said event to the trace circuitry.

8. Data processing apparatus according to claim 7, in which:
the processing element is configured to detect, as a detected number of instructions, one or both of: (i) a number of instructions in a set of waypoint instructions which are older than an instruction which triggered the event but which have not yet reached the predetermined stage relative to the instruction pipeline, and (ii) a number of instructions in a set of waypoint instructions which are younger than the instruction which triggered the event and which have already reached the predetermined stage relative to the instruction pipeline;
the trace circuitry is configured to generate the position data in response to the detected number of instructions detected by the processing element.

9. Data processing apparatus according to claim 7, in which:
the trace circuitry comprises instruction sampling circuitry to generate a sample of information relating to execution of a given instruction; and
the processing element is configured to detect the generation of a sample of information relating to the execution of the given instruction as an event for which an item of event trace data relating to that given instruction can be generated by the trace circuitry.

10. Data processing apparatus according to claim 9, in which the trace circuitry is configured to associate the position data, for the given item of event trace data generated in response to the processing element detecting the generation of a sample of information relating to the execution of a given instruction, with the generated sample of information.

11. Data processing apparatus according to claim 10, in which the trace circuitry is configured to include the position data as part of the generated sample of information.

12. Data processing apparatus according to claim 11, in which the trace circuitry is configured to associate first partial position data, for the given item of event trace data generated in response to the processing element detecting the generation of a sample of information relating to the execution of a given instruction, with the generated sample of information and to include second partial position data in the serial stream of items of trace data, the position data associated with the given item of event trace data being a combination of the first and second partial position data.

13. Data processing apparatus according to claim 5, in which the position data is included with the serial stream of items of trace data.

14. Data processing apparatus according to claim 1, in which the predetermined stage relative to the instruction pipeline is retirement of an instruction from the instruction pipeline.

15. Data processing apparatus according to claim 1, in which the set of waypoint instructions comprises a category of instructions selected from the list consisting of:
   instructions which can change program flow;
   instructions which can change program flow and barrier instructions; and
   all instructions.

16. A trace apparatus comprising:
   trace circuitry to generate items of trace data indicative of processing activities of a processing element having an instruction pipeline to execute instructions;
   the trace circuitry being configured to generate items of event trace data in response to events initiated by execution of corresponding instructions by the instruction pipeline and to generate items of waypoint trace data in response to instructions, in a set of waypoint instructions, reaching a predetermined stage relative to the instruction pipeline; and
   the trace circuitry being configured to generate position data indicating a position of a given item of event trace data relative to one or more items of waypoint trace data within a sequence of instruction execution by the instruction pipeline.

17. A diagnostic apparatus comprising:
   input circuitry to receive a stream of trace data indicative of processing activities of a processing element having an instruction pipeline to execute instructions, the stream of trace data comprising items of event trace data in response to events initiated by execution of instructions by the instruction pipeline and items of waypoint trace data in response to instructions, in a set of waypoint instructions, reaching a predetermined stage relative to the instruction pipeline; and
   analysing circuitry responsive to position data, indicating a position of a given item of event trace data relative to one or more items of waypoint trace data within a sequence of instruction execution by the instruction pipeline, to modify a relative order of one or more items of trace data in the stream of trace data.

18. Diagnostic apparatus according to claim 17, in which a position of the given item of event trace data in a serial stream relative to items of waypoint trace data, when modified by the diagnostic apparatus in response to position data associated with that given item of event trace data, represents a position, within a sequence of instruction execution by the instruction pipeline, of an instruction for which that given item of event trace data was generated, relative to instructions for which those items of waypoint trace data were generated.

19. Diagnostic apparatus according to claim 17, in which the input circuitry is configured to receive successive samples of information each relating to execution of a respective instruction by the processing element, each sample of information having an associated item of event trace data.

20. Diagnostic apparatus according to claim 19, in which position data relating to an item of event trace data associated with a given sample of information is included as part of that given sample of information.

21. Diagnostic apparatus according to claim 19, in which:
   the samples of information include a sample of a program counter register of the processing element; and
   the analysing circuitry is configured to detect a particular instruction, to which the sample of information relates, from the sample of the program counter register and a modified relative order of the items of trace data.

22. A data processing method comprising:
   generating items of trace data indicative of processing activities of a processing element having an instruction pipeline to execute instructions, comprising generating items of event trace data in response to events initiated by execution of corresponding instructions by the instruction pipeline and generating items of waypoint trace data in response to instructions, in a set of waypoint instructions, reaching a predetermined stage relative to the instruction pipeline; and
   generating position data indicating a position of a given item of event trace data relative to one or more items of waypoint trace data within a sequence of instruction execution by the instruction pipeline.

23. A diagnostic method comprising:
   receiving a stream of trace data indicative of processing activities of a processing element having an instruction pipeline to execute instructions, the stream of trace data comprising items of event trace data in response to events initiated by execution of corresponding instructions by the instruction pipeline and items of waypoint trace data in response to instructions, in a set of waypoint instructions, reaching a predetermined stage relative to the instruction pipeline; and
   modifying a relative order of one or more items of trace data in the stream of trace data in response to position data indicating a position of a given item of event trace data relative to one or more items of waypoint trace data within a sequence of instruction execution by the instruction pipeline.

* * * * *